United States Patent
Pozzuoli et al.

(10) Patent No.: US 7,085,938 B1
(45) Date of Patent: Aug. 1, 2006

(54) PROTECTIVE RELAY WITH EMBEDDED WEB SERVER

(75) Inventors: Marzio Pozzuoli, Maple (CA); Norris Woodruff, Toronto (CA); Andrew Baigent, Toronto (CA); Scott Gilbertson, Mississauga (CA)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 09/605,010

(22) Filed: Jun. 27, 2000

(51) Int. Cl.
*G08F 1/26* (2006.01)

(52) U.S. Cl. .................. 713/300; 713/310; 361/80; 700/292; 709/271; 709/223; 709/230

(58) Field of Classification Search ............... 713/300, 713/310, 320; 361/64, 66, 68, 80, 81; 700/286, 700/291, 292; 702/58, 62; 707/1, 2; 709/217, 709/218, 219, 223, 224, 230
See application file for complete search history.

(56) References Cited

U.S. PATENT DOCUMENTS

| | | | |
|---|---|---|---|
| 5,680,324 A | 10/1997 | Schweitzer, III et al. | ... 364/514 |
| 5,715,823 A * | 2/1998 | Wood et al. | ........ 600/437 |
| 5,973,696 A * | 10/1999 | Agranat et al. | ...... 345/760 |
| 5,982,595 A | 11/1999 | Pozzuoli | |
| 6,061,603 A | 5/2000 | Papadopoulos et al. | |
| 6,151,625 A | 11/2000 | Swales et al. | |
| 6,170,007 B1 | 1/2001 | Venkatraman et al. | ....... 709/218 |
| 6,201,996 B1 * | 3/2001 | Crater et al. | ............. 700/9 |
| 6,396,839 B1 * | 5/2002 | Ardalan et al. | ........ 370/401 |
| 6,571,153 B1 * | 5/2003 | Maeda et al. | ........ 700/292 |

FOREIGN PATENT DOCUMENTS

| | | | |
|---|---|---|---|
| EP | 838768 A2 * | 4/1998 | |
| WO | WO 9941691 A1 * | 8/1999 | |

OTHER PUBLICATIONS

Donald O'Sullivan—"SNMP Interface to the x10 World"—Dec. 1997—Newsgroups: comp.home.automation.*
adrianmichaud@my-dejanews.com—"Embedded Ethernet TCP/IP and Web Server"—Nov. 17, 1998—Newsgroups: comp.arch.embedded.*
Agranat Systems, Inc., "Agranat Systems Awarded US Patent for Embedded Web server," Yahoo! Internet Article dated Nov. 8, 1999.
PCT/US01/20383, International Search Report mailed Jun. 27, 2001.
DE 197 22 898 A (Siemens AG), Dec. 10, 1998, the whole document.
Patent Abstracts of Japan, vol. 1999, No. 12, Oct. 29, 1999 & JP 11 191927 A (Toshiba Corp), Jul. 13, 1999 abstract.
Translation of DE 197 22 898 A1.*

* cited by examiner

*Primary Examiner*—Thuan Du
(74) *Attorney, Agent, or Firm*—Hunton & Williams

(57) ABSTRACT

A protective relay having an embedded web server to allow communication with a remote device having a standard web browser package. The relay can receive and transmit HTML files according to the HTTP protocol over a communications network. The relay can receive commands from the remote device, and can generate and return requested data to the remote device.

22 Claims, 4 Drawing Sheets

Microfiche Appendix Included
(1 Microfiche, 53 Pages)

PROTECTIVE RELAY WITH EMBEDDED WEB SERVER

REFERENCE TO MICROFICHE APPENDIX

This application has a microfiche appendix of a computer program listing. The appendix consists of one (1) sheet of microfiche containing 53 frames.

BACKGROUND OF THE INVENTION

The present invention generally relates to devices and systems for providing protective control to power networks. More particularly, the present invention relates to the remote control of protective relays and remote display of power system data.

Protective relaying devices are widely known and used for providing protective control of power systems. Such protective relays incorporate a digital microprocessor for providing protective control of power distribution systems. There are known digital protective relays which have communications capabilities. A microprocessor-based protective relaying device having communications capability is disclosed, for example, in U.S. Pat. No. 5,982,585. However, the communications capabilities are typically relatively limited, and might include, for example, an application layer protocol such as Modbus RTU or ASCII for communication over a Universal Asynchronous Receiver Transmitter (UART) data link layer with an RS485, RS232 or other fiber optic physical layer interface. Typically, digital protective relays having a communications capability support only one application layer communications protocol, even where the relay includes multiple communications ports.

U.S. Pat. No. 5,680,324 discloses a communications processor for electric power substations. The communications processor includes an electronic network system with seventeen individual communications ports, four quadrature UART devices, each of which serves four of the ports, and a microprocessor which processes and controls the flow of data under the control of stored control programs, command settings, and command logic. Relays, meters, or other intelligent electronic devices are connected to some of the ports, and remote terminal units, local computers, or a modem are connected to master ports. The communication processor has a capability of communicating with the various port devices through an ASCII communication format. The processor is capable of supporting simultaneous communication with multiple devices and users. However, the processor is a centralized communication device, which is separate and distinct from the protective relays, meters, and other port devices. Accordingly, the >324 patent does not focus on the communications capabilities of the relays or other port devices.

Digital protective relays incorporating communications capabilities require a human machine interface (HMI) which allows a user to perform configuration and control tasks, and which retrieves and displays to the user information stored within the relay. Conventionally, the HMI interface is implemented in product-specific software, and manufacturers of relays may have more than a dozen different HMI software packages to communicate with various types of relays.

To further enhance the utility of a digital protective relay, and to provide more comprehensive protective control of power distribution systems, it would be desirable to improve the communications capabilities of digital protective relays. More particularly, it would be desirable for a protective relay to include a Human Machine Interface which incorporates a common "off-the-shelf" software package which is not product-specific. Known protective relays do not sufficiently address these needs.

SUMMARY OF THE INVENTION

The present invention overcomes the problems noted above, and achieves additional advantages, by providing for a protective relaying device with embedded web server technology to allow the device to be remotely controlled and/or monitored by any remote device having a standard web browser software package. According to exemplary embodiments described herein, a protective relay for providing protective control to a power system includes a microprocessor, first and second connections to communications network (e.g., the Internet) and the power system, respectively, and a communications server configured to receive relay configuration commands from a remote computer over the communications network in a network format, and to provide power system data and relay status data to the remote computer over the communications network in the network format.

The present invention advantageously allows a human machine interface to be generated remotely using standard browser packages, and avoids the need for device-specific software.

BRIEF DESCRIPTION OF THE DRAWINGS

The features and advantages of the present invention can be understood more completely by reading the following Detailed Description of presently-preferred embodiments of the present invention in conjunction with the accompanying drawings, in which like reference indicators are used to designate like elements, and in which.

DETAILED DESCRIPTION OF THE INVENTION

Figure 1:
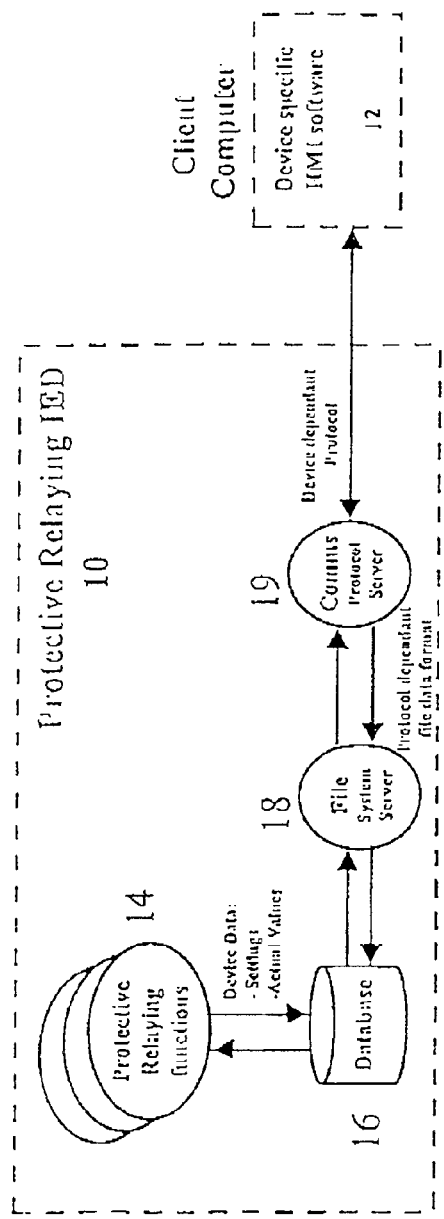
FIG. 1 is a diagram of a conventional arrangement of a protective relaying device in communication with a remote computer.

Referring now to FIG. 1, a conventional arrangement of a protective relaying intelligent electronic device (IED) 10 in communication with a remote client computer 12 is shown. The device 10 includes functional modules 14 stored as executable software programs which provide various protective relaying functions as are known in the art. A database 16 exchanges device data, including relay settings and actual power system values with the functional modules 14. A file system server 18 is provided in the device 10, and exchanges data with the database 16. A communications protocol server 19 is provided in the device 10; the server 19 is configured to exchange data with the file system server 18 in a protocol dependent file data format based on the device protocol for the specific type of remote client computer 12. The server 19 is further configured to exchange data with the remote client computer 12 using a device-dependent protocol dependent upon the type of remote client computer 12. Client computer 12 executes a device-specific Human Machine Interface (HMI) software package, of which many are known, to allow a user to interface with the client computer and remotely monitor and control the device 10.

Figure 2:
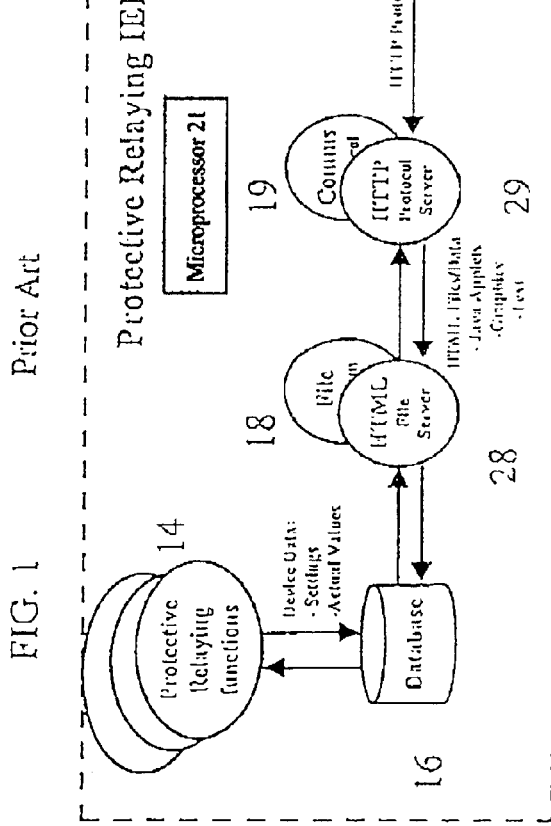
FIG. 2 is a diagram of an arrangement of a protective relaying device in communication with a remote computer according to an embodiment of the present invention.

Referring now to FIG. 2, an arrangement according to an embodiment of the present invention is shown. The device of FIG. 2 includes functional modules 14 stored as executable software programs which provide various protective relaying functions. FIG. 2 shows a microprocessor 21 associated with the protective relaying device. The microprocessor may perform operations as described below. In this embodiment, a hypertext markup language (HTML) server 28 is provided in addition to, or in place of, file system server 18. Further, a hypertext transfer protocol server 29 is provided in addition to, or in place of, communications protocol server 19. The HTML server 28 is positioned and configured to exchange communication signals with the database 16, and is positioned and configured to exchange communication signals (such as HTML files or data, which may include java applets, graphics, or text) with the HTTP protocol server 29. The HTTP protocol server 29 communicates with a remote client computer 22 which operates according to a web browser software. The web browser software can be any suitable internet browser program including the well-known Internet Explorer browser available from Microsoft corporation or the well-known Netscape Navigator browser available from Netscape corporation. Such browsers are not device-specific; that is, they will run on any of a wide variety of remote computer devices, unlike the conventional arrangement of FIG. 1, where a device-specific communication program is required.

Figure 3:
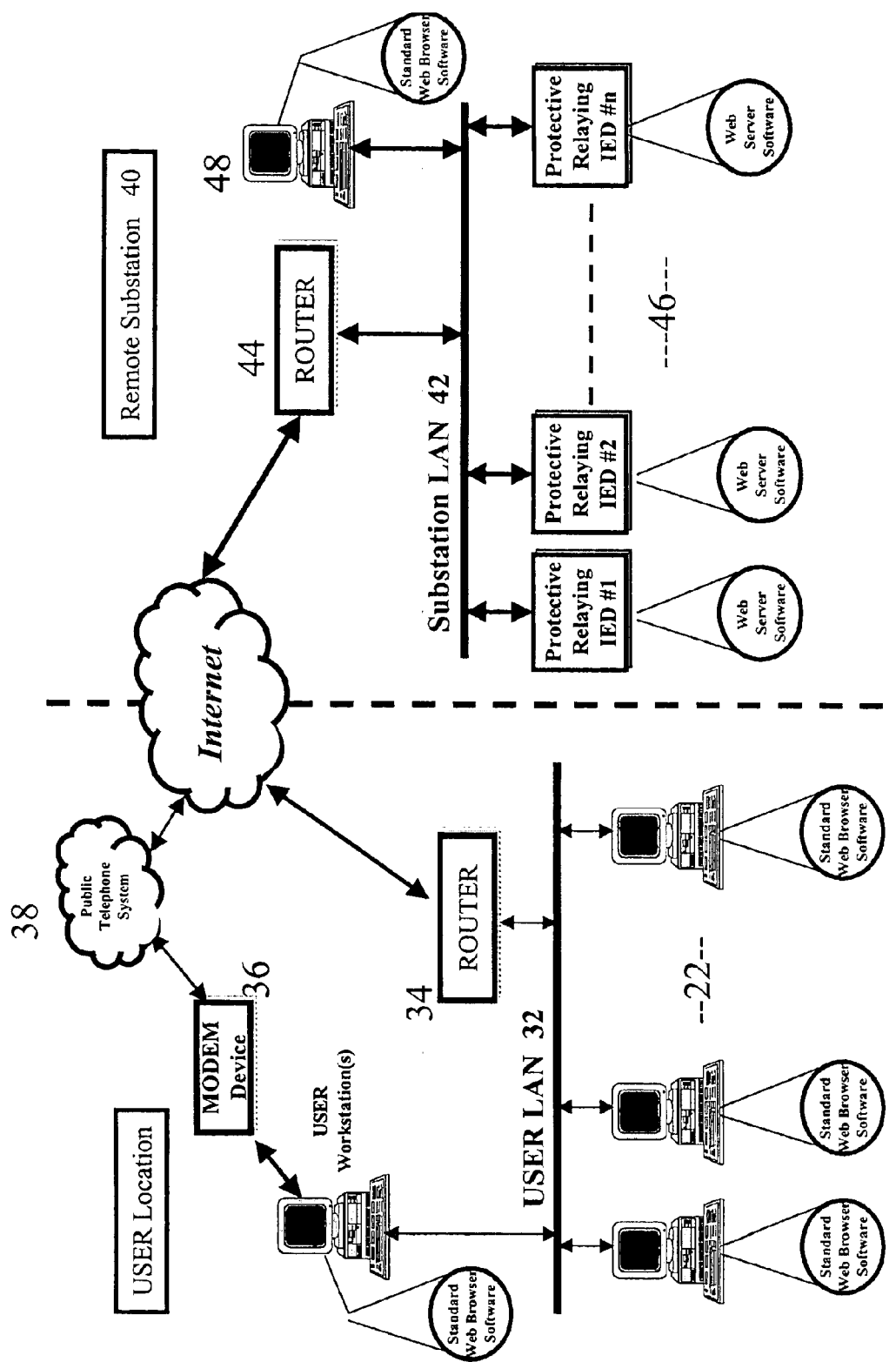
FIG. 3 is a diagram showing a variety of communications links for communicating with one or more protective relaying devices according to an embodiment of the present invention.

Referring now to FIG. 3, a diagram showing numerous communication possibilities that can be implemented based on the arrangement of FIG. 2. In FIG. 3, a plurality of remote computer devices 22 located at a user location physically remote from a power system are connected by a local area network (LAN) 32. Each computer 22 includes a standard web browser software package; thus, each computer 22 can connect to, and communicate over, a computer network such as the Internet, via either a router 34 designed for connected LAN devices to the Internet, or via modem device 36 and public switched telephone network 38. Some distance from the remote user location is a remote substation 40 which includes a second router 44 and a second local area network (LAN) 42, which are separate and independent from the router 34 and LAN 32 associated with the remote user location. The LAN 42 of the remote substation 40 connects a plurality of protective relaying devices 46 in communication with one another. Each protective relaying device includes web server software substantially as shown and described with respect to FIG. 2. Further, the LAN 42 of the remote substation 40 can also be directly connected to a substation computer 48 equipped with web browser software.

In the diagram of FIG. 3, it will be appreciated that by providing web browser software in the protective relaying devices 46, each device can be individually monitored, configured, and controlled remotely by any of a number of devices over any of a number of communication links. For example, one or more individual devices 46 can be monitored and/or controlled by a remote computer 22 connected to a LAN 32 which is independent of the substation LAN 42 via router 34. One or more individual devices 46 can be monitored and/or controlled by a remote computer 22 via a modem 36 and telephone network 38. One or more individual devices 46 can also be monitored and/or controlled by a substation computer 48 connected to the LAN 42 of the substation 40. It will further be appreciated that numerous other communication links are possible to link a remote control device to a protective relaying device. For example, wireless communication techniques can also be used to remotely monitor and/or control one or more of the protective relaying devices 46; further, one or more protective relays associated with different substations can be remotely controlled and/or monitored in parallel from the same or different remote computers. Other possibilities can be envisioned and implemented by those of ordinary skill in the art.

Figure 4:
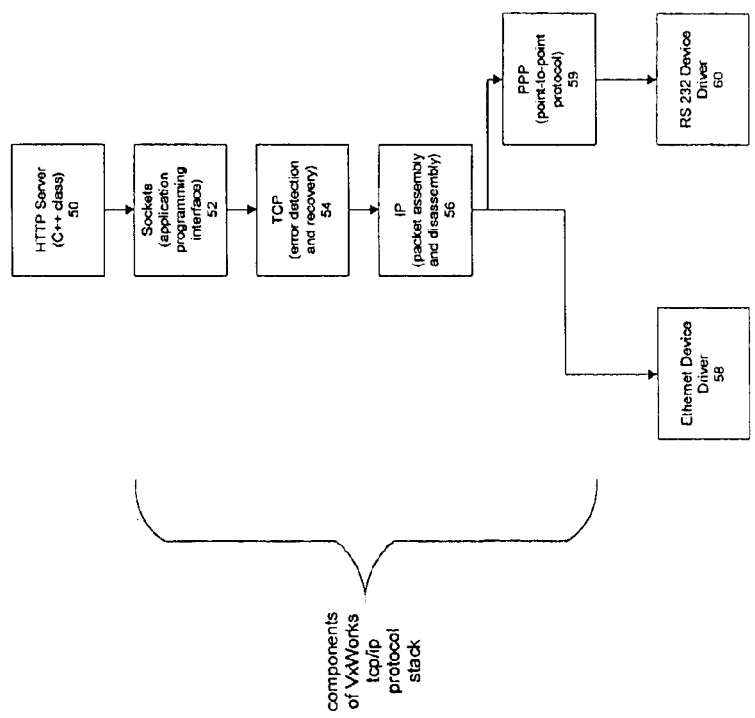
FIG. 4 is a diagram of a server protocol stack implemented in a protective relaying device according to an embodiment of the present invention.

Referring now to FIG. 4, a diagram showing a protocol "stack" or communications profile of a protective relaying device according to an embodiment of the present invention is shown. Such a protocol stack can be implemented by suitably programming a microprocessor associated with the protective relaying device. The protocol stack is a layered arrangement of communication protocols. In the example of FIG. 4, a hypertext transfer protocol (HTTP) server 50 is of the C++ class; that is, operating according to software code written in C++ language. It has been found that the C++ code integrates well with the other software code in certain protective relays. The use of C++ code allows data to be generated dynamically rather than requiring the storing of previously-generated files for later transmission by the server 50. The server 50 is provided as part of the protective relaying device. The protocol stack provided to server 50 includes a sockets application programming interface 52, such as the well-known secure sockets layer (SSL) as a next layer of communication protocol. The protocol stack of FIG. 4 further includes a transmission control protocol (TCP) layer 54 which allows for error detection and recovery; as is well-known in the art, the TCP protocol provides a reliable stream delivery and virtual connection service to applications through the use of sequenced acknowledgment with retransmission of packets when necessary. The protocol stack of FIG. 4 further includes an Internet Protocol (IP) layer 56 which allows packets of data to be assembled and disassembled in the protective relaying device. This protocol stack (consisting of layers 52, 54, and 56) can support communications necessary to achieve the monitoring and control techniques of FIG. 3 via an ethernet device driver 58. Further, the server 50 can achieve the monitoring and control techniques of FIG. 3 via an RS-232 device driver 60 if the protocol stack of layers 52, 54, and 56 is supplemented by a point-to-point protocol (PPP) layer 59. As is known in the art, the Point-to-Point Protocol (PPP) originally developed as an encapsulation protocol for transporting IP traffic over point-to-point links. PPP also established a standard for the assignment and management of IP addresses, asynchronous (start/stop) and bit-oriented synchronous encapsulation, network protocol multiplexing, link configuration, link quality testing, error detection, and option negotiation for such capabilities as network-layer address negotiation and data-compression negotiation. PPP supports these functions by providing an extensible Link Control Protocol (LCP) and a family of Network Control Protocols (NCPs) to negotiate optional configuration parameters and facilities. PPP supports other protocols in addition to IP. It will of course be appreciated that the protocol stack of FIG. 4 can be modified in a variety of ways to support communications between the server 50 and remote devices using other protocols or data formats.

Figure 5:
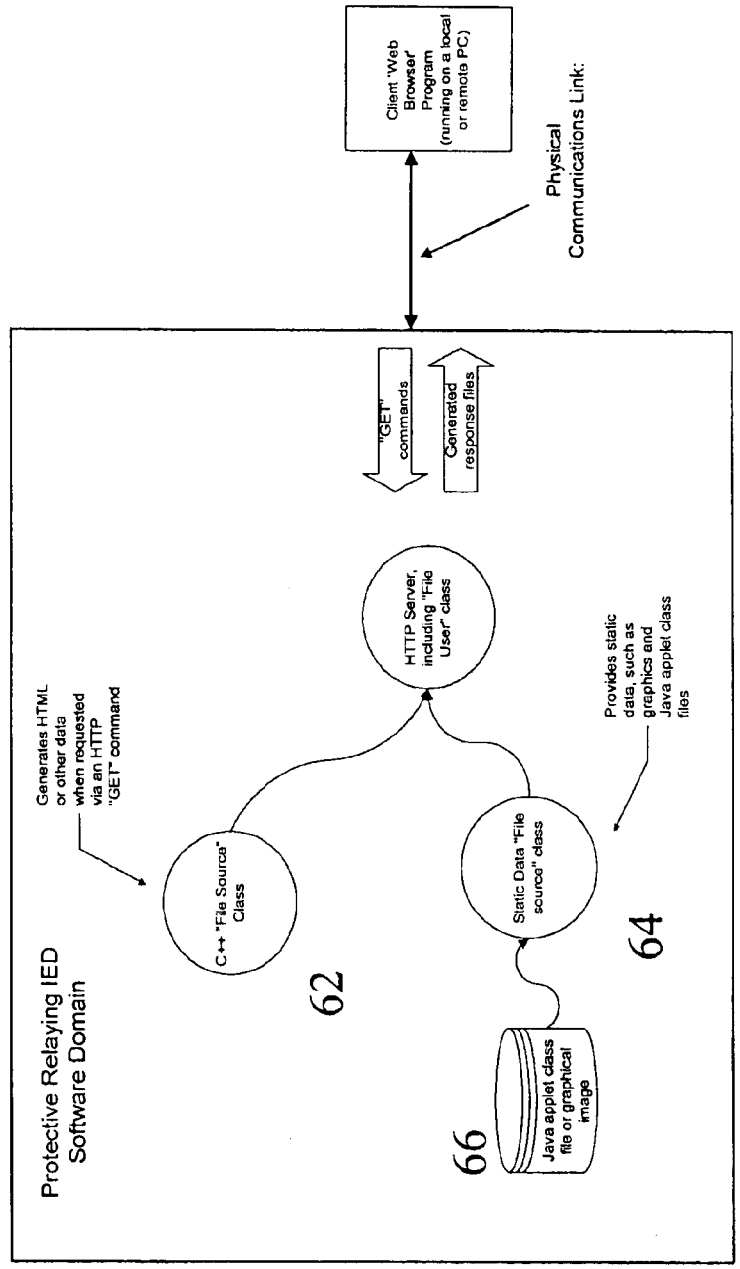
FIG. 5 is a data flow diagram showing a server data flow in a protective relaying device according to an embodiment of the present invention.

Referring now to FIG. 5, a data flow diagram illustrative of data flow through an exemplary HTTP server in a protective relay is shown. Such a data flow can be implemented by suitably programming a microprocessor associated with the protective relaying device. In this example, the relay server 50 receives one or more "GET" commands from a web browser program running on a remote client computer over a physical communication link (such as of the types shown and described with respect to FIG. 3). The relay server 50 transmits the files generated in response to the "GET" commands. Each http connection is given a "File User" object, which manages the process of obtaining data from a "File Source" class, such as C++ file source class 62 (which generates HTML or other data when requested via an HTTP "GET" command) or static data file source class 64 (which provides static data such as graphics and Java applet class files stored in memory 66 in response to the "GET" commands). The "File Source" base class provides a "find" function, which the http server 50 uses to locate the file source object associated with a filename provided in the one or more "GET" commands.

In the example of FIG. 5, file source "arguments" accept arguments in addition to the file name. These arguments can specify which particular data should be included in the generated web page. For example, if a user at a remote client computer desires to have a summary memory map displayed, a GET command would specify "memoryMap.htm". To display a detailed map for a particular module, the GET command would specify "memoryMap.htm?xxx", where "xxx" identifies a particular module. The C++ class associated with the "memoryMap.htm" filename uses the xxx parameter to determine what data to provide.

In a typical scenario, the web browser running on the remote client computer GETs an html page using an embedded Java applet command. The browser than gets the applet class file and runs it. The running applet periodically (e.g., several times per second) retrieves a dynamically generated HTML page from the http server. The Java code formats the received data and displays it graphically in the web browser using the display of the remote client computer.

Referring now to a source code listing for an exemplary software program implementing the present invention is provided. The source code is Copyright, 2000, General Electric Company.

While the foregoing description includes numerous details, it is to be understood that these are provided for purposes of illustration and explanation only, and that these are not limitations of the invention. The examples described above can be widely varied by one of ordinary skill in the art without departing from the spirit and the scope of the invention, as defined by the following claims and their legal equivalents.

What is claimed is:

1. A protective relay for providing protective control to a power system, comprising:
    a microprocessor for implementing a data flow in a communications server in the protective relay;
    first and second connections to a communications network and the power system, respectively;
    the communications server configured to receive relay configuration commands from a remote computer over the communications network in a network format, and to provide power system data and relay status data to the remote computer over the communications network in the network format.

2. The relay of claim 1, wherein the communications network is the Internet and the network format is the hypertext transfer protocol.

3. The relay of claim 2, wherein the remote computer incorporates an Internet browser to allow a user to interface with the protective relay.

4. The relay of claim 1, wherein the microprocessor supports one or more of: hypertext transfer protocol, hypertext markup language, and Java Applets.

5. The relay of claim 1, wherein the communications server includes an HTML file server.

6. The relay of claim 1, wherein the communications server includes an HTTP protocol server.

7. The relay of claim 1, wherein the communications server communicates with the remote computer over a local area network (LAN).

8. The relay of claim 1, wherein the communications server communicates with the remote computer via the Internet and at least one router.

9. The relay of claim 8, wherein the communications server communicates with the remote computer via the Internet, at least a second router, and a remote Local Area Network (LAN).

10. The relay of claim 8, wherein the communications server communicates with the remote computer via the Internet, a public switched telephone network (PSTN), and at least one modem.

11. The relay of claim 1, wherein the communications server operates according to instructions provided in a C++ code.

12. The relay of claim 1, wherein the communications server includes one or more of the following protocol layers: secure socket layer, transmission control protocol, internet protocol, and point-to-point protocol.

13. The relay of claim 1, wherein the communication server receives a command from the remote computer, generates dynamic HTML data in response to the command if the command is of a first type, and generates previously-stored static data in response to the command if the command is of a second type.

14. A method for monitoring and/or controlling a protective relaying device, comprising the steps of:
    receiving, at the protective relaying device, one or more commands from a remote device over a physical communications link;
    generating, in the relay, HTML data dynamically in response to the one or more commands if the commands are of a first type, and transmitting the HTML data to the remote device over the physical communications link; and
    generating, in the relay, static data from previously-stored data files in response to the one or more commands if the one or more commands are of a second type, and transmitting the static data to the remote device over the communications link.

15. The method of claim 14, wherein the static data includes Java applet files.

16. The method of claim 14, wherein the steps of generating are performed by consulting a database in the protective relay, the database storing protective relay data.

17. A protective relay for providing protective control to a power system, comprising:
    a database storing data including protective relay control settings and power system data;
    a file system server operatively connected to the database, the file system server capable of generating HTML files from the data stored in the database;

a communication protocol server operatively connected to the file system server and to a communication network, the communication protocol server capable of transmitting and receiving HTML files according to a hypertext transfer protocol over the communications network.

18. The relay of claim 17, wherein the HTML files are exchanged with a remote computer having a web browser.

19. The relay of claim 17, wherein the HTML files received by the communication protocol server contain relay configuration commands.

20. The relay of claim 17, wherein the HTML files received by the communication protocol server contain requests for data in the database.

21. The relay of claim 20, wherein the requests are one of a first type and a second type, the first type requesting dynamically generated HTML data and the second type requesting static data.

22. The method of claim 21, wherein the static data includes Java applet files.

* * * * *